(No Model.)
H. B. ADAMS.
ATTACHMENT FOR COFFEE POTS.
No. 529,349. Patented Nov. 20, 1894.
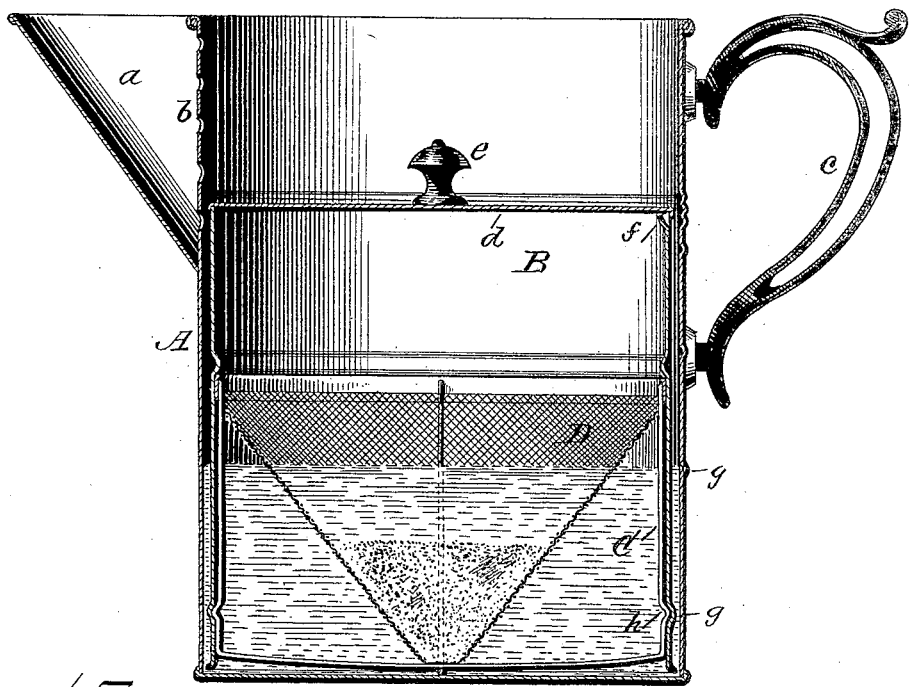
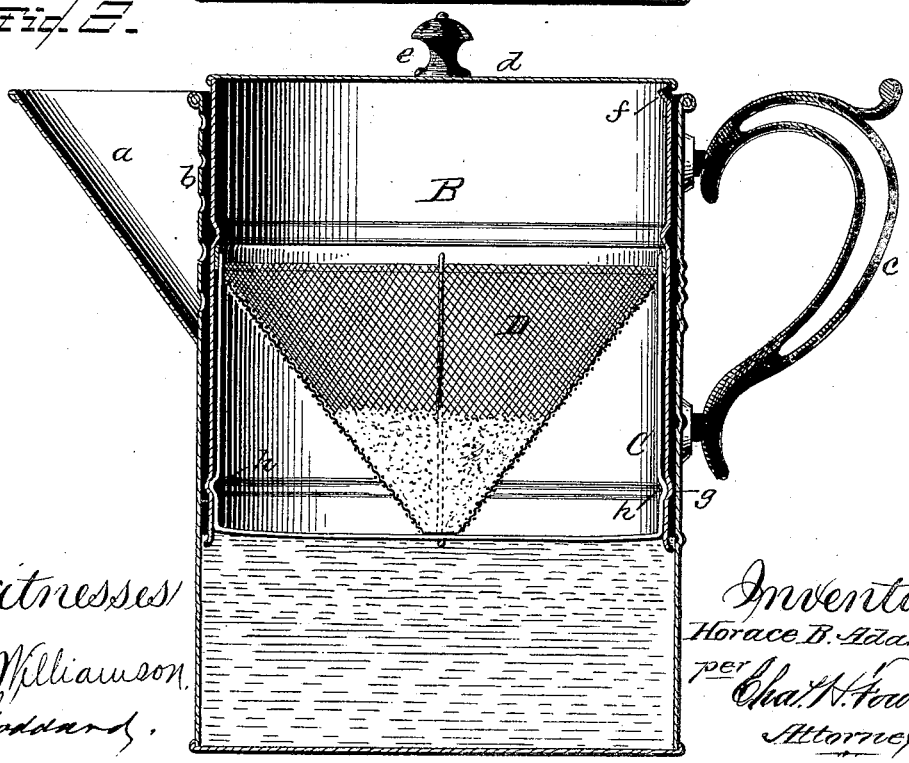

UNITED STATES PATENT OFFICE.

HORACE B. ADAMS, OF OWEGO, NEW YORK.

ATTACHMENT FOR COFFEE-POTS.

SPECIFICATION forming part of Letters Patent No. 529,349, dated November 20, 1894.

Application filed May 28, 1894. Serial No. 512,745. (No model.)

*To all whom it may concern:*

Be it known that I, HORACE B. ADAMS, a citizen of the United States, residing at Owego, in the county of Tioga and State of New York, have invented certain new and useful Improvements in Attachments to Coffee-Pots; and I do hereby declare that the following is a full, clear, and exact description of the same, reference being had to the annexed drawings, making a part of this specification, and to the letters of reference marked thereon.

The present invention has relation to that class of coffee-pots provided with a removable receptacle of perforated sheet metal or wire gauze for containing the ground coffee which is suspended within the pot and the strength removed from the coffee by contact with the boiling water or the steam generated therefrom.

It is the purpose of the invention to provide an attachment to a coffee-pot for containing the ground coffee that will be operated automatically by the action of the steam so that the ground coffee will be lifted out of the water at a certain period or when the liquid coffee is of a certain strength.

The invention consists of a device constructed substantially as shown in the drawings and hereinafter described and claimed.

Figure 1 of the drawings represents a sectional elevation of a coffee-pot showing my improved device in position when first placed within the pot. Fig. 2 is a similar view showing the device in a raised position by the action of the steam so as to elevate the ground coffee out of the water.

In the accompanying drawings A represents a sectional view of a coffee pot of the usual construction and provided with the spout $a$ and the strainer $b$ and the handle $c$.

The device constituting the invention consists of a bottomless cylinder B provided with a closed top $d$ permanently connected thereto, said top having a suitable handle $e$ for lifting it out of the pot or placing it therein as required. The cylinder B has an opening $f$ for the escape of air and steam, as will be hereinafter more fully described. The cylinder B fits loosely within the pot A and has near its lower end a circumferential groove $g$ in which fit the shoulders $h$ of a wire-frame C. This frame has connected thereto a cone-shaped receptacle D for containing the ground coffee, and is preferably constructed of wire gauze so that the water will pass through it and come in contact with the coffee.

The frame C is constructed of spring wire so that by its elastic quality it will be securely held in place and the shoulders in engagement with the circumferential groove and conveniently removed from the cylinder and replaced when required.

If preferred perforated sheet metal may be substituted for the wire gauze or cloth may be used of sufficient fineness to admit the water freely passing through it, and the attachment constituting my invention may be used with any of the ordinary forms of coffee-pots.

It is believed that the automatic action of the cylinder is an enterely new feature in coffee-pots of the class hereinbefore referred to and its operation will now be clearly explained. The frame C being first removed from the cylinder B the receptacle D is supplied with the desired quantity of ground coffee, and after the necessary amount of water has been placed within the pot, the frame with the receptacle is replaced. Now if there were not some means for the escape of air in the cylinder above the water line, the cylinder could not be forced down to the position as shown in Fig. 1, and to provide for this the opening $f$ is made which allows for the escape of the air as the cylinder is forced down to the position shown, so that the ground coffee will be submerged in the water. When the pot is placed upon the stove or other heat generating device and the water begins boiling, the steam therefrom will pass out in small quantities through the opening $f$, but the opening is so graduated in size that the escape of steam will be less than the generation of it from the boiling water. After a certain period when the steam in the cylinder becomes of a certain pressure, its force will lift the cylinder out of the water and also the receptacle with the ground coffee, as shown in Fig. 2 of the drawings, after which the cylinder may be removed from the pot and the top thereof closed by the usual cover.

The cylinder when acted upon by the steam serves as an indicator in ascertaining when to remove the coffee-pot from the stove, and the coffee when made being of a uniform strength when a given amount of ground coffee and water are used.

Having now fully described my invention, what I claim as new, and desire to secure by Letters Patent, is—

1. An attachment for a coffee-pot, consisting of a bottomless cylinder having a closed top permanently connected thereto and an opening for the escape of air and steam, and a receptacle for ground coffee removably secured within the cylinder, substantially as and for the purpose set forth.

2. An attachment for coffee-pots, consisting of a bottomless cylinder, having a closed top and an opening for the escape of air and steam, and a wire frame removably held within the cylinder and having a receptacle for the ground coffee connected thereto, substantially as and for the purpose specified.

In testimony that I claim the above I have hereunto subscribed my name in the presence of two witnesses.

HORACE B. ADAMS.

Witnesses:
F. S. BLOODGOOD,
C. A. KIMBALL.